(12) United States Patent
Liu et al.

(10) Patent No.: US 7,431,613 B1
(45) Date of Patent: Oct. 7, 2008

(54) ELECTRONIC CHARGING CUP ASSEMBLY

(75) Inventors: Chih-Hsiang Liu, Chang Hua (TW); Shu-Fen Li, Chang Hua (TW)

(73) Assignee: J Sheng Co., Ltd., Changhua, Chuanghwa Hsien (TW)

( * ) Notice: Subject to any disclaimer, the term of this patent is extended or adjusted under 35 U.S.C. 154(b) by 0 days.

(21) Appl. No.: 12/045,564

(22) Filed: Mar. 10, 2008

(51) Int. Cl.
*H01R 13/60* (2006.01)

(52) U.S. Cl. ........................ 439/568; 439/248; 439/929; 219/432; 219/436

(58) Field of Classification Search .................. 439/500, 439/568, 248, 929; 219/432, 436
See application file for complete search history.

(56) References Cited

U.S. PATENT DOCUMENTS 6,072,161 A * 6/2000 Stein ........................... 219/432
6,670,583 B2 * 12/2003 Kara .......................... 219/432
6,852,954 B1 * 2/2005 Liu et al. .................... 219/436
6,864,462 B2 * 3/2005 Sanoner et al. ............. 219/387

* cited by examiner

*Primary Examiner*—Tho D Ta
(74) *Attorney, Agent, or Firm*—Egbert Law Offices

(57) ABSTRACT

The present invention provides an electronic charging cup assembly, including an electronic charging cup and charging cup holder. The electronic charging cup is provided with an embedded cell module and a button set, so that the cell module supplies sufficient power to the linear conducting strip covering the cup core. Since the cell module is a rechargeable cell structure, it is only required to place the electronic charging cup into the charging cup holder in the event of electric exhaustion of cell module, thereby achieving the purpose of additional power supply with improved applicability.

3 Claims, 11 Drawing Sheets

ELECTRONIC CHARGING CUP ASSEMBLY

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a charging cup, and more particularly to an innovative electronic charging cup assembly.

2. Description of Related Art

Including Information Disclosed Under 37 CFR 1.97 and 37 CFR 1.98.

The people may drink hot beverages in the everyday life, but the temperature of exposed beverages may decline gradually, making it difficult to drink in such a case. For this reason, vacuum cups are often applied to maintain the temperature of hot beverages.

However, the vacuum cups currently available are just used for postponing the temperature decline of hot liquid, not for reheating. Hence, a longer period of placement in open air will lead to gradual elimination of heat.

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

The unique electronic charging cup assembly of the present invention is intended to reheat liquid in the core of the cup. A button is pressed to activate the cell module in the electronic charging cup assembly to transfer and supply a heat source to the linear conducting strip, reheating the liquid in the core of the cup. As the cell module is an embedded structure, the electronic charging cup assembly could be placed anywhere and heated without external devices.

Since the cell module of the present invention is a rechargeable cell, it is only required to place the electronic charging cup assembly into the cup container and to supply power to the cell module via a power supply seat in the event of electric exhaustion of the cell module. Moreover, a USB socket on the power supply seat allows a USB connecting line to insert into a host computer or to connect with a power connector so that the power supply end can be inserted for continuous feeding of the power supply seat.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
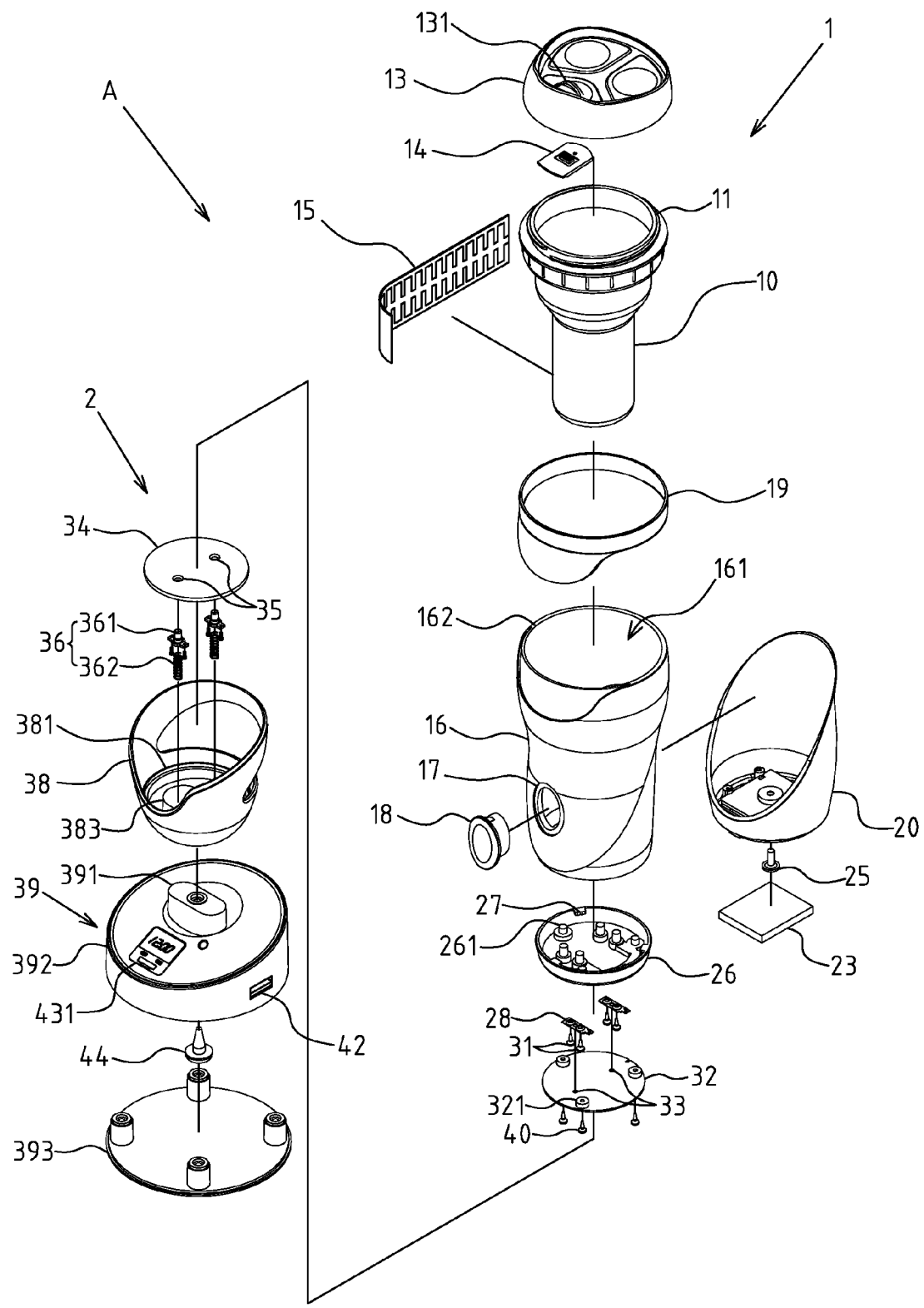
FIG. 1 shows an exploded perspective view of the present invention.
Figure 2:
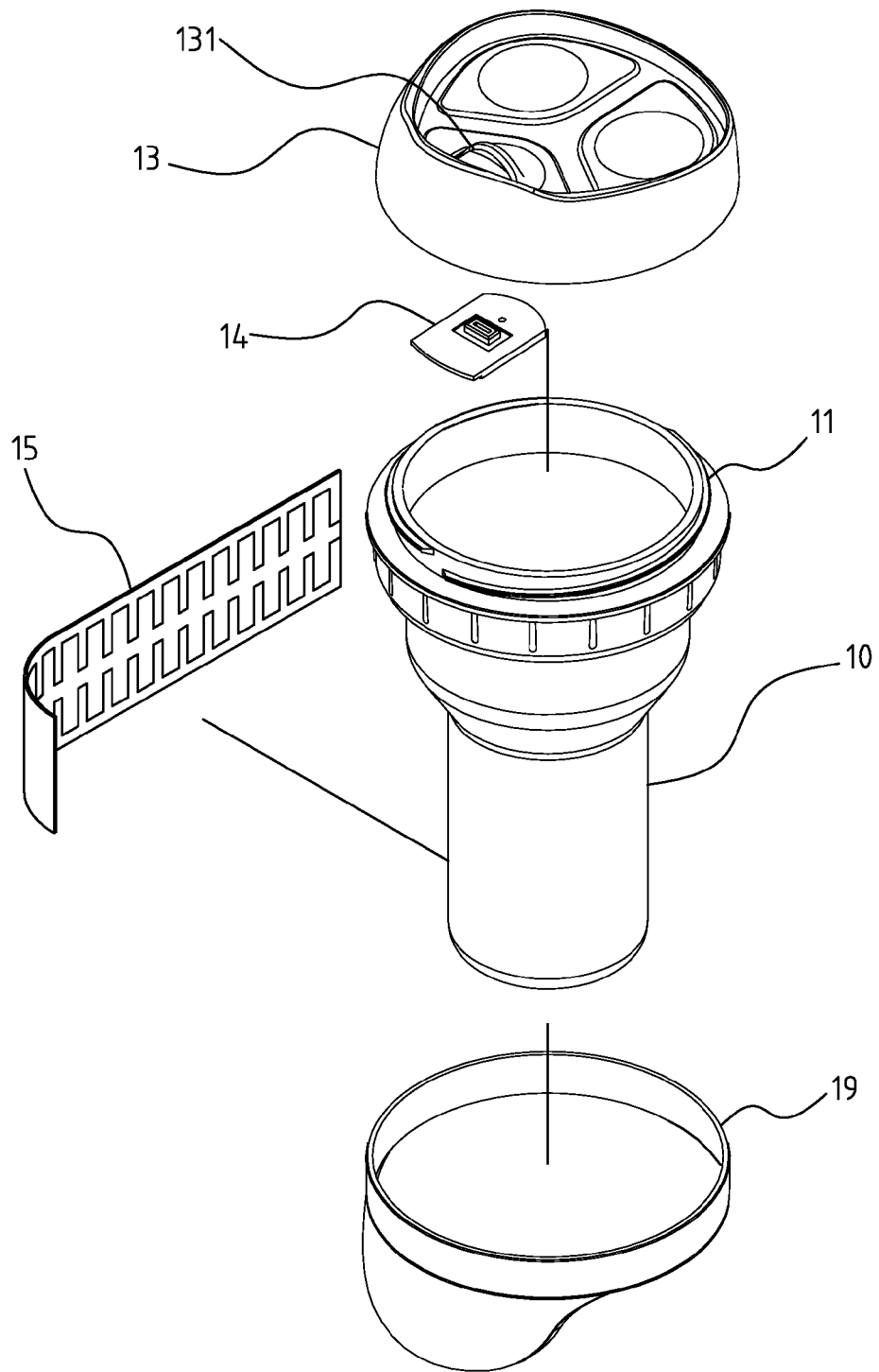
FIG. 2 shows the first partial perspective view of the present invention.
Figure 3:
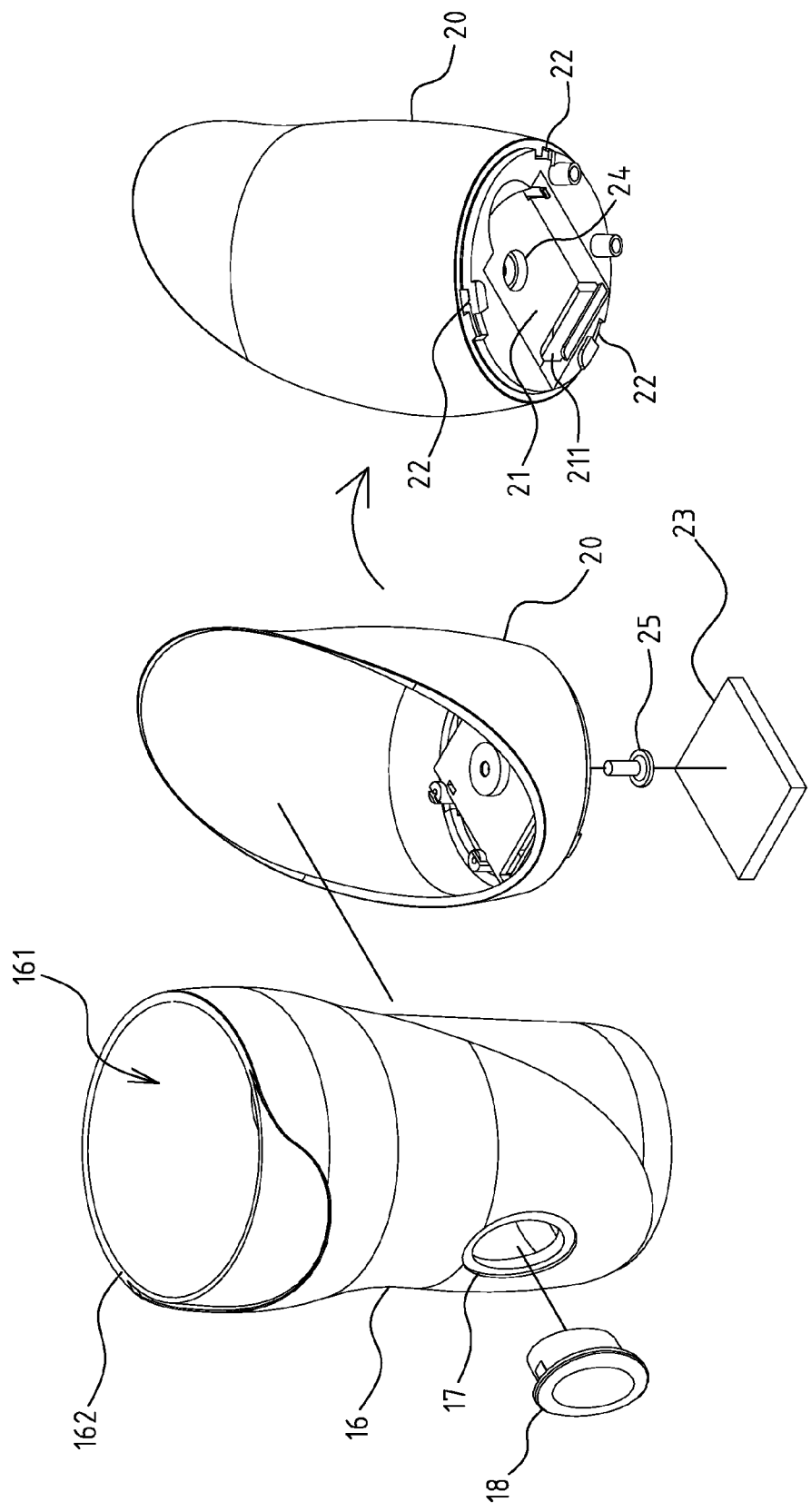
FIG. 3 shows the second partial perspective view of the present invention.
Figure 4:
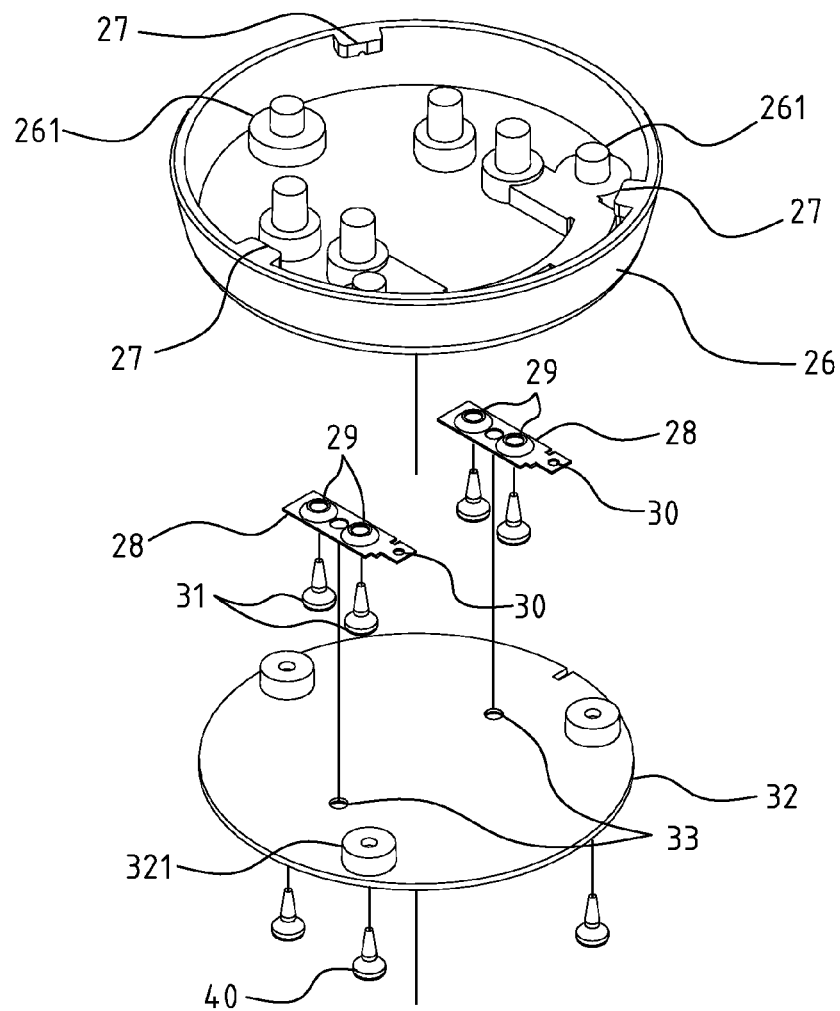
FIG. 4 shows the third partial perspective view of the present invention.
Figure 4:
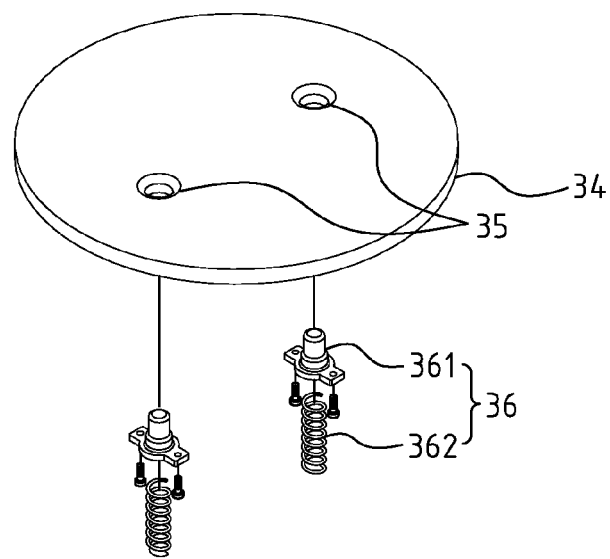
Figure 5:
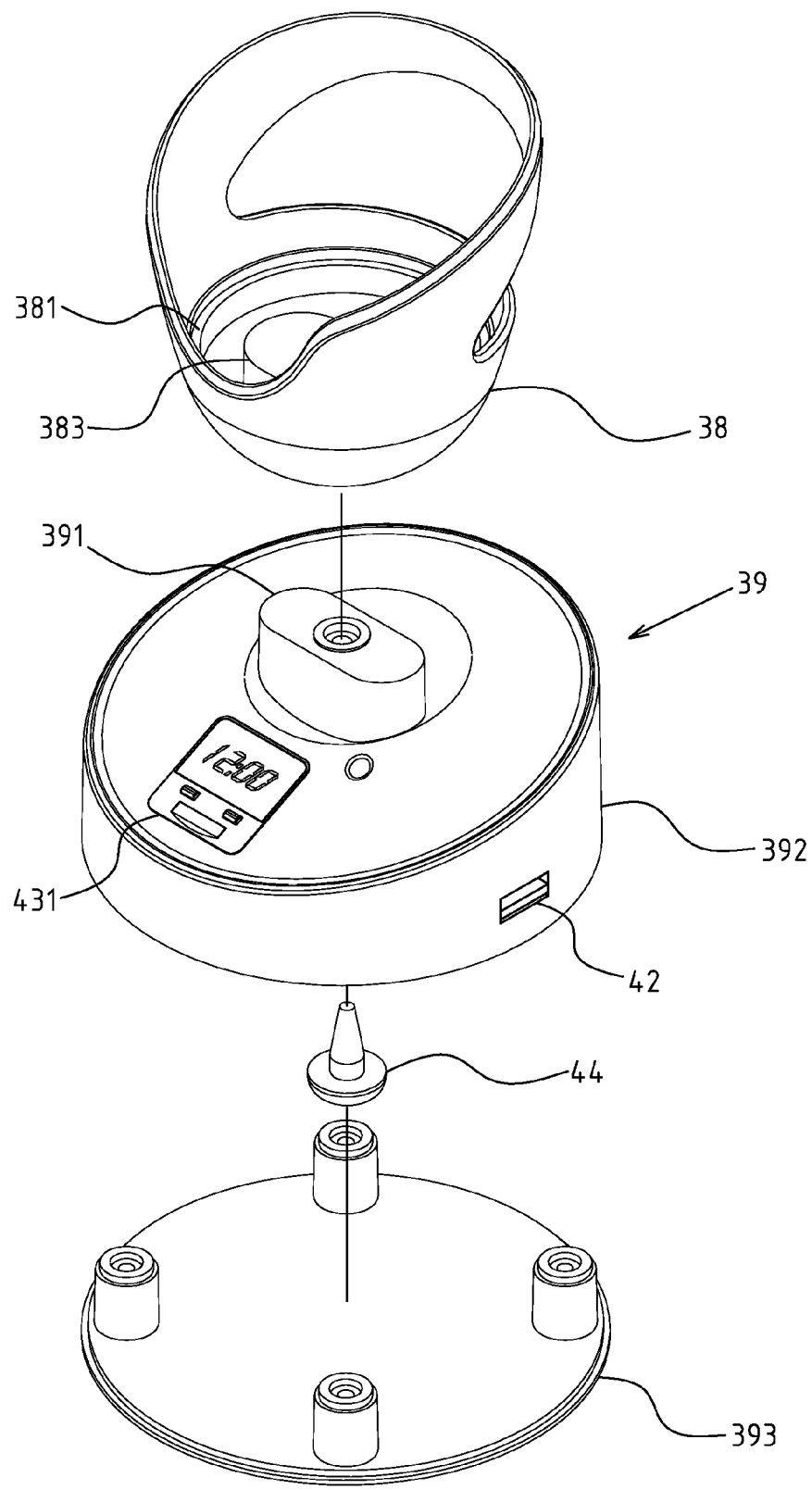
FIG. 5 shows the fourth partial perspective view of the present invention.
Figure 6:
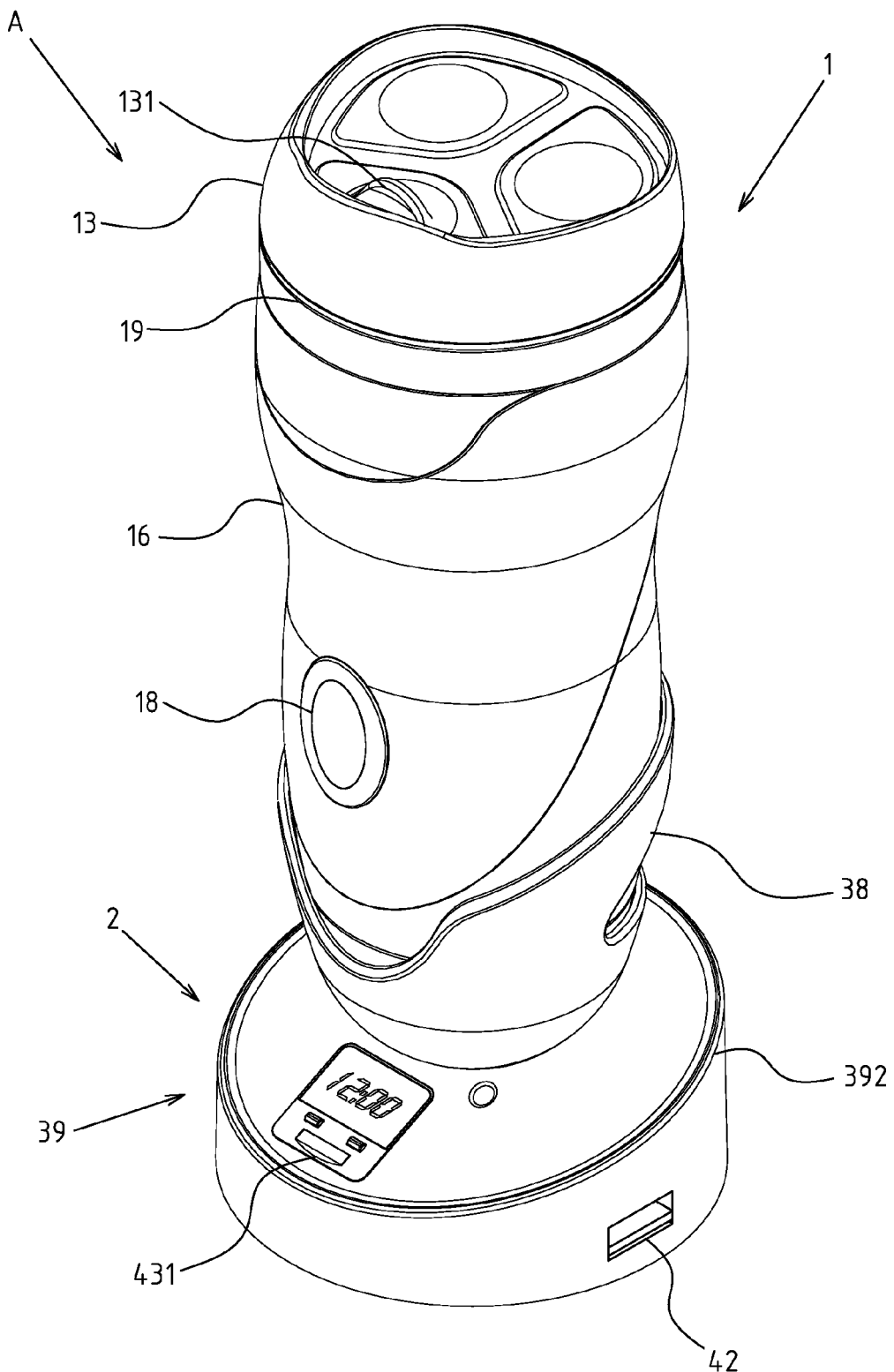
FIG. 6 shows the first assembled perspective view of the present invention
Figure 7:
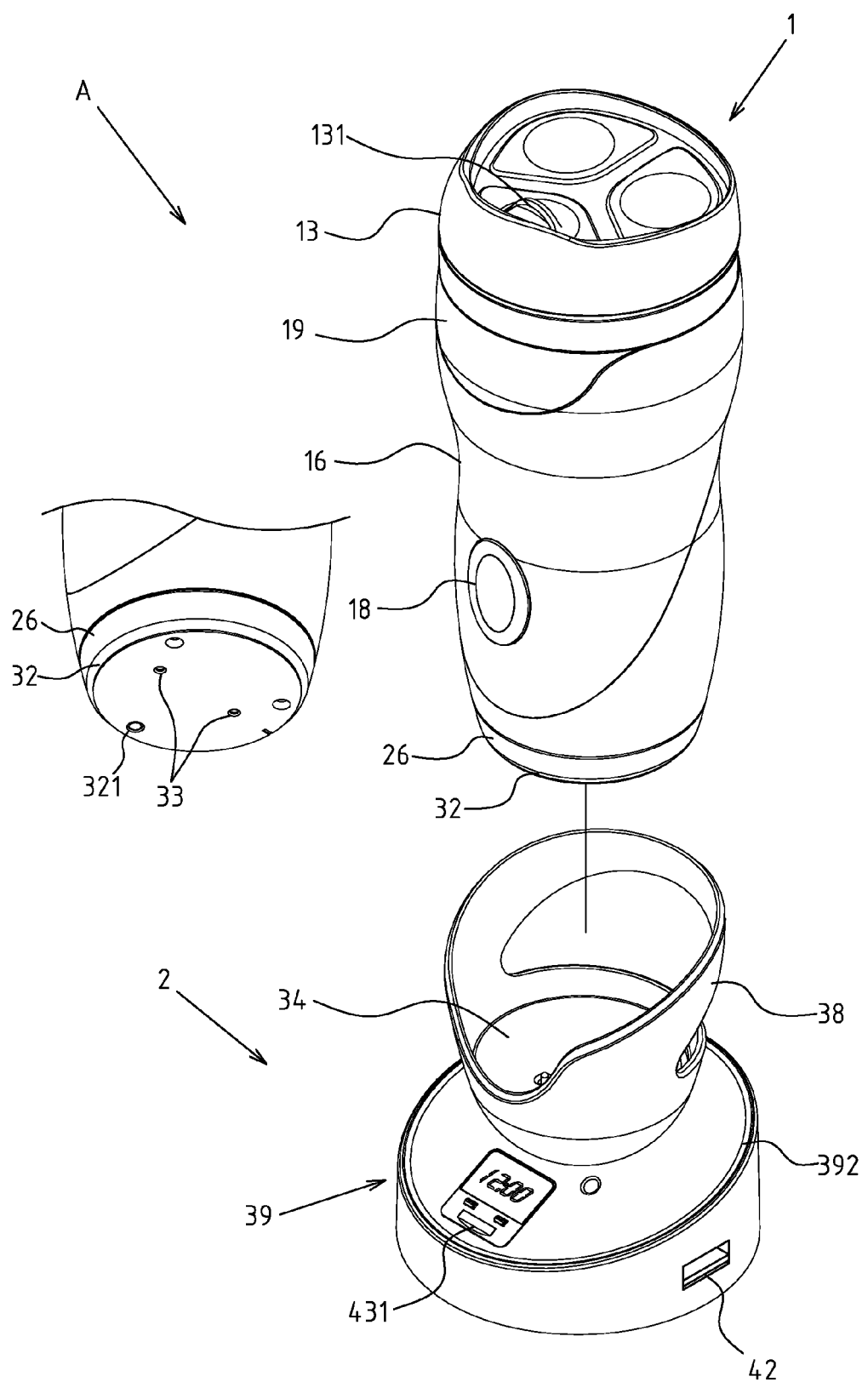
FIG. 7 shows the second assembled perspective view of the present invention.
Figure 8:
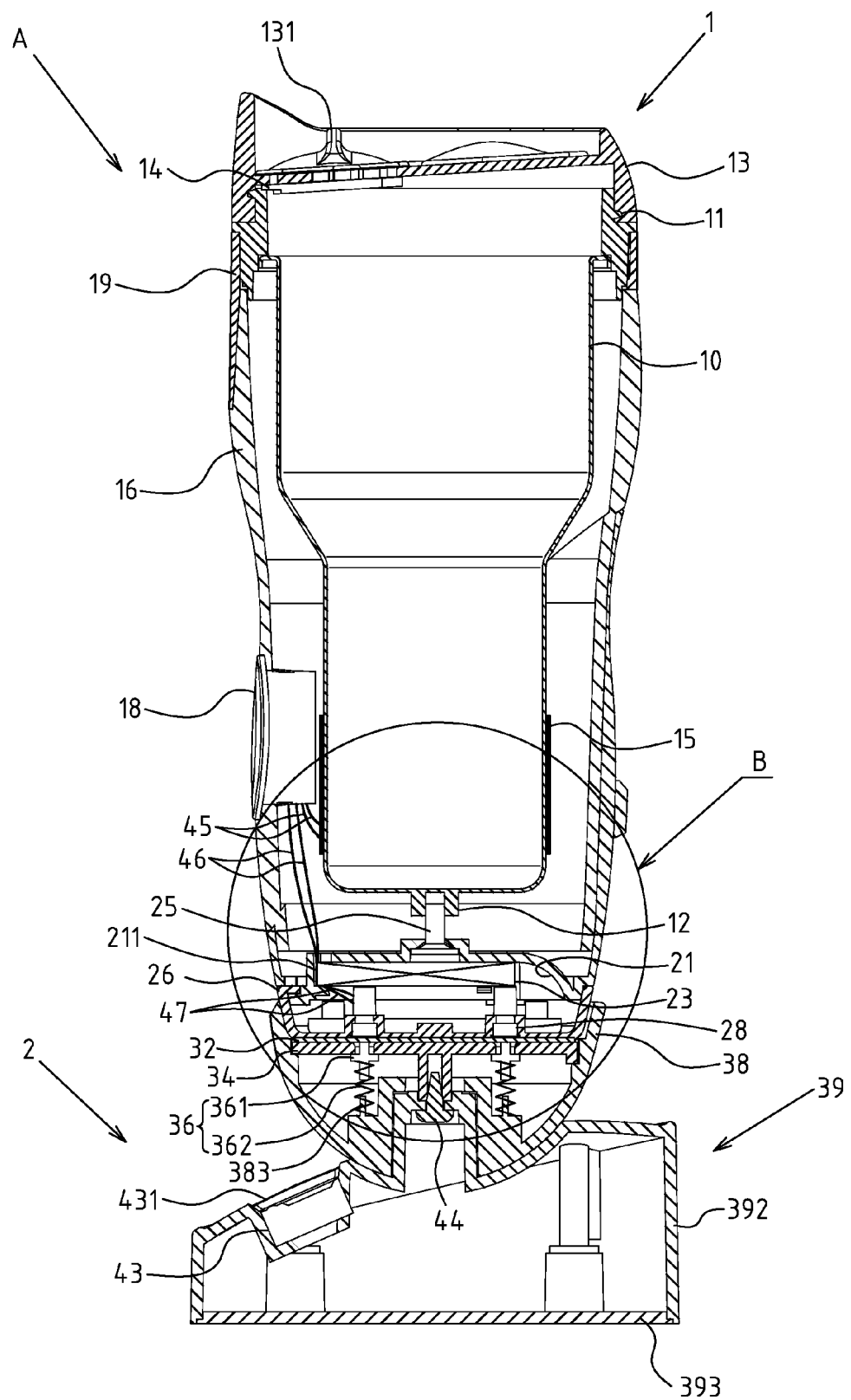
FIG. 8 shows the first assembled sectional view of the present invention.
Figure 9:
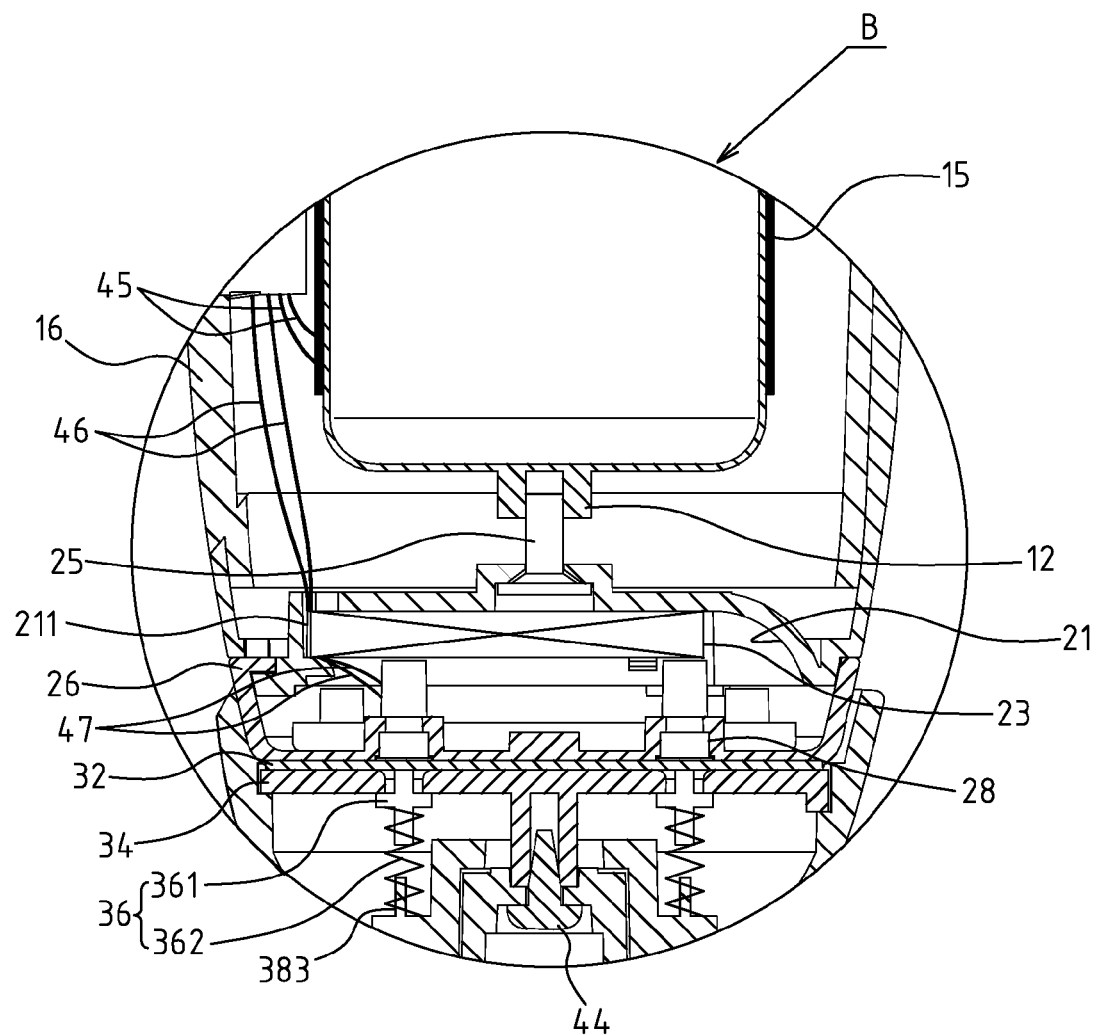
FIG. 9 shows a partially enlarged perspective view of part B of the present invention.
Figure 10:
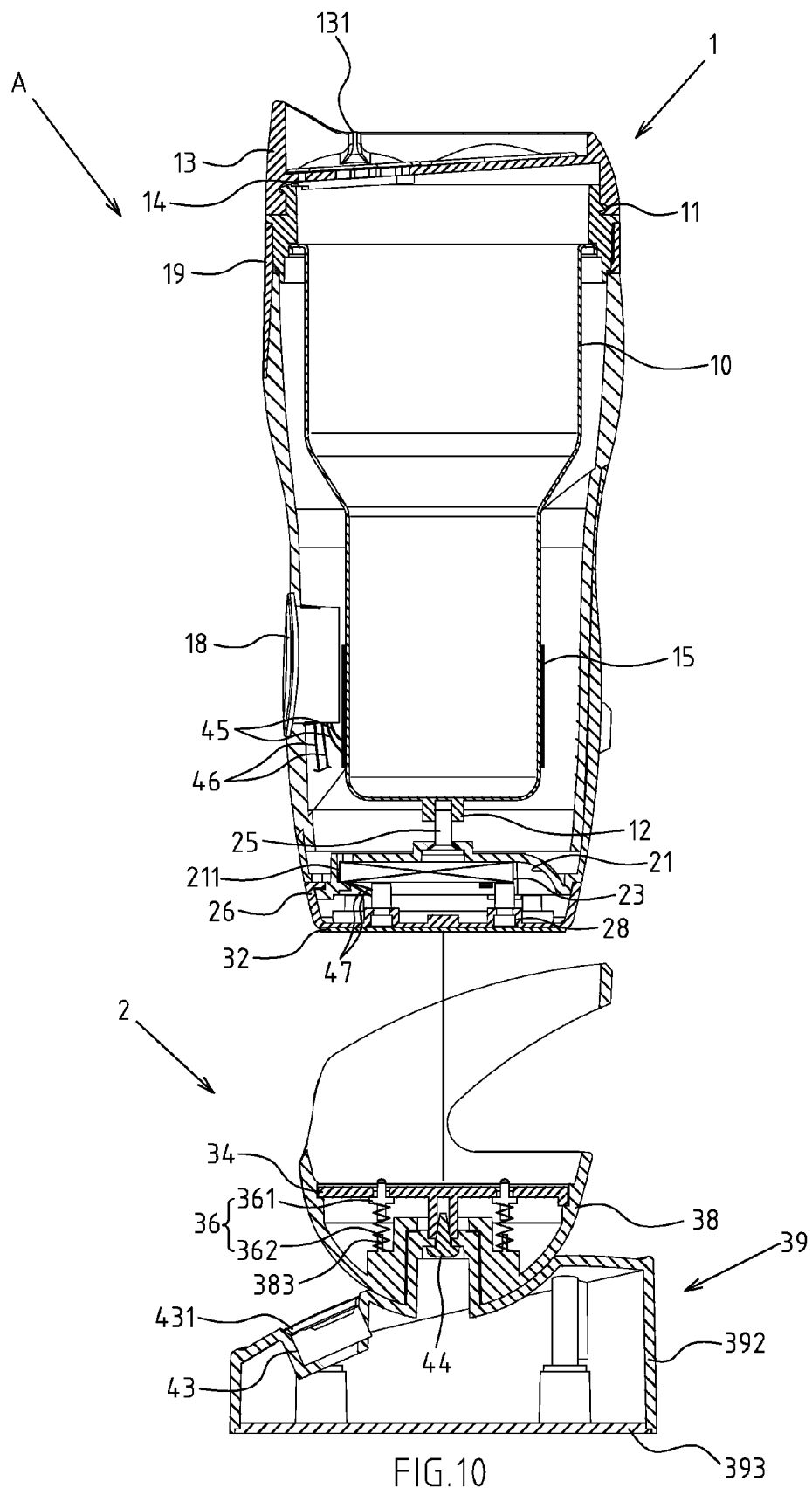
FIG. 10 shows the second assembled sectional view of the present invention.
Figure 11:
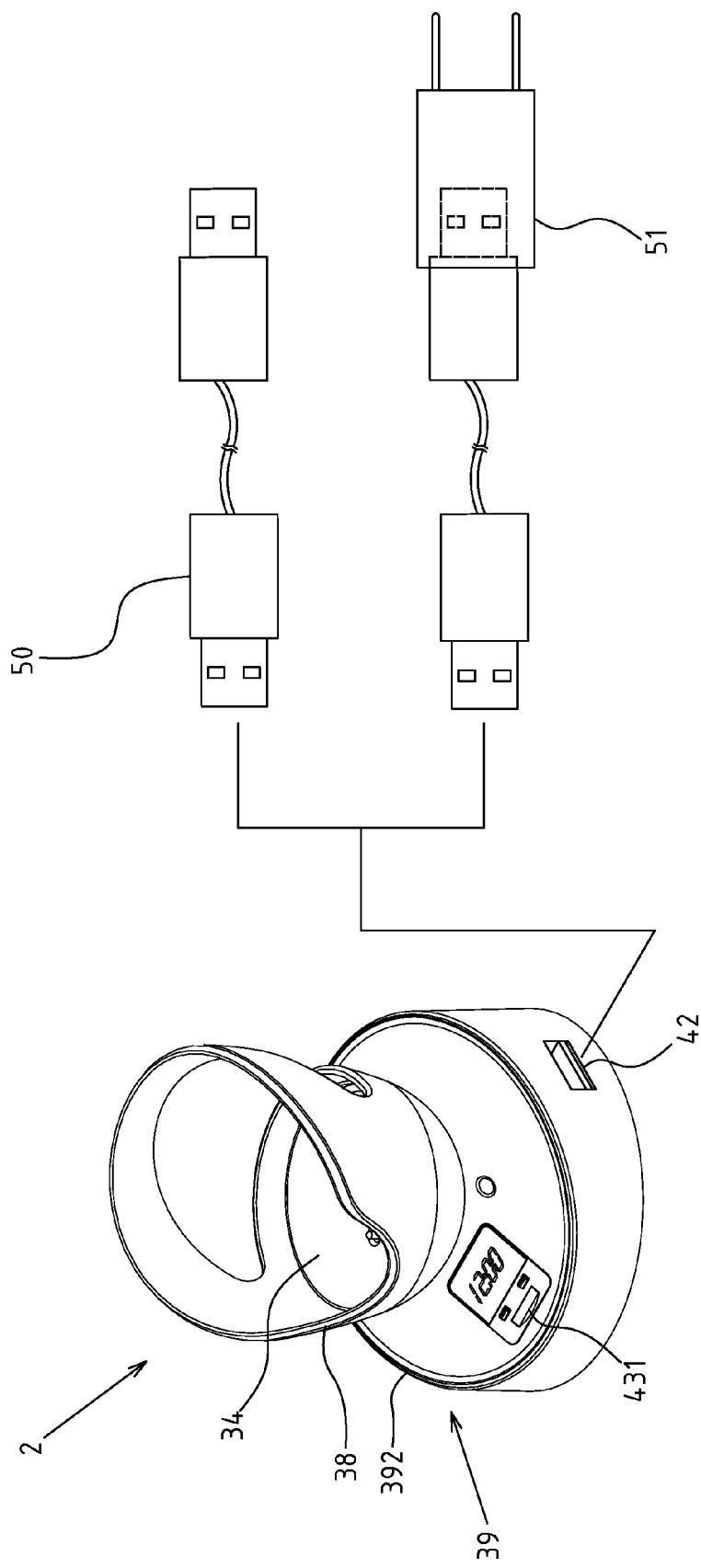
FIG. 11 shows a partial assembled schematic view and perspective view of the application of the USB socket element of the present invention.

FIGS. 1-11 depict preferred embodiments of the electronic charging cup assembly of the present invention. The embodiments are provided only for explanatory purposes with respect to the patent claims.

The electronic charging cup assembly A comprises an electronic charging cup 1 and a charging cup holder 2.

The electronic charging cup 1 comprises a cup core 10 with a top provided with a mating portion 11 and a bottom provided with a snapping portion 12. There is a cup lid 13, which is assembled onto the mating portion 11 of the cup core 10. The cup lid 13 is also provided with an outlet 131, which is adapted with a cup lid buckle 14. A linear conducting strip 15 externally covers the cup core 10. A cup body 16 is provided with an inner space 161 for accommodating the cup core 10. A button mating portion 17 is arranged at preset location on the perimeter of the cup body 16, and a snap mating portion 162 is placed on top of the cup body 16. A button set 18 is assembled onto button mating portion 17 on the perimeter of the cup body 16. A buckle set 19 is assembled onto snap mating portion 162 on top of the cup body 16. A lower cup body 20 is assembled at lower part of the cup body 16. A cell mating portion 21 is arranged at bottom of the lower cup body 20. A conductive mating portion 211 is laterally arranged onto the cell mating portion 21, while a positioning hole 24 is placed at bottom of the cell mating portion 21 and connected with a locator 25. Thus, the snapping portion 12 at the bottom of the cup core 10 is assembled with the locator 25 for positioning purposes. Moreover, a snapping portion 22 is arranged around the bottom of the lower cup body 20.

The electronic charge cup 1 also includes a cell module 23, such as a rechargeable cell structure, assembled onto the cell mating portion 21 of the lower cup body 20. A base 26 is assembled at a lower part of the lower cup body 20 for covering and positioning the cell module 23. A locking portion 27 is placed on the top of the base 26, so that the snapping portion 22 of the lower cup body 20 is adapted to mate with the locking portion 27. Moreover, a coupling portion 261 is arranged at bottom of the perimeter of the base 26. A conductive module 28 is provided with a locating portion 29 and wire punch hole 30, while being positioned at a bottom of the base 26 when the locator 31 penetrates through the locating portion 29. A limiting board 32 is assembled at a lower part of the base 26 and is provided with two punch holes 33 as well as positioning portions 321 around the board, allowing mating with coupling portion 261 of the base 26 via locator 40.

The charging cup holder 2 comprises a cup container 38, fitted with a limiting flange 381 and locating column 382. An adapting board 34 is assembled onto the limiting flange 381 of the cup container 38. The adapting board 34 is provided with two punch holes 35. A limit component 36 is assembled at lower part of the adapting board 34, being composed of a lug seat 361 and an elastic part 362 at lower part of the lug seat 361. The lug seat 361 penetrates through two punch holes 35 on the adapting board 34, while the elastic part 362 could be sleeved onto the locating column 382 of the cup container 38. A power supply seat 39 is assembled at a lower part of the cup container 38. Male, female coupling portions 383, 391 are provided between the cup container 38 and power supply seat 39, and fixed via locator 44.

The power supply seat 39 is composed of an upper cover 392 and a lower cover 393. An integrated circuit (IC) controller 43 is arranged at an inner surface of the upper cover 392, and timer 431 and USB socket 42 are arranged at an external surface.

Based upon above-specified structures, the present invention is operated as follows:

Referring to FIGS. 2-10, when it is intended to reheat the liquid in the cup core 10, the button set 18 on the perimeter of the cup body 16 is pressed by the user to activate the assembly. The button set 18 is electrically connected with the linear conducting strip 15 covered onto the cup core 10. In such a case, the cell module 23 heats the liquid by transferring heat between electric wires 45, 46, enabling conductive heating of the linear conducting strip 15 and, subsequently, reheating the liquid in the cup core 10.

Furthermore, since the cell module 23 in the lower cup body 20 is a rechargeable cell structure, it is only required to place the electronic charging cup 1 into the charging cup holder 2 in the event of electric exhaustion of cell module 23. The punch hole 33 of limiting board 32 under the base 26 of electronic charging cup 1 must be adapted to mate with lug seat 361 on the adapting board 34 assembled in the cup container 38. Thus, the lug seat 361 contacts the conductive module 28. The wire punch hole 30 at one end of the conductive module 28 penetrates by the electric wire 47 and then connects with the conductive mating portion 211 at one side of the cell mating portion 21. Thus, the power supply to the cell module 23 through the power supply seat 39 is enabled. Since a USB socket 42 at one side of the power supply seat 39 allows USB connecting line 50 to insert into the host computer or to connect with a power connector 51 (shown in FIG. 11), the power supply end is inserted for continuous feeding of the power supply.

We claim:

1. An electronic charging cup assembly, comprising:
an electronic charging cup comprising:
   a cup core, having a top provided with a mating portion and a bottom provided with a snapping portion;
   a cup lid, being assembled onto said mating portion and being provided with an outlet, adapted with a cup lid buckle;
   a linear conducting strip, covered externally onto said cup core;
   a cup body, being provided with an inner space, accommodating said cup core, a perimeter with a button mating portion arranged at a preset location on said perimeter of the cup body, and top with a snap mating portion placed thereon;
   a button set, assembled onto said button mating portion;
   a buckle set, assembled onto said snap mating portion;
   a lower cup body, being assembled at a lower part of said cup body and having a bottom with a cell mating portion arranged therein, said cell mating portion having a conductive mating portion is laterally arranged thereon and a bottom with a positioning hole placed at said bottom and connected with a locator, said snapping portion being assembled with said locator, said bottom having a snapping portion arranged around said bottom of said lower cup body;
   a cell module, assembled onto said cell mating portion of said lower cup body;
   a base, being assembled at said lower part of said lower cup body, covering and positioning said cell module, said base having a top with a locking portion placed thereon, said snapping portion of said lower cup body being adapted to mate with said locking portion, a coupling portion being arranged at a bottom of a perimeter of said base;
   a conductive module, being provided with a locating portion and a wire punch hole and being positioned at said bottom of said base when a locator penetrates through said locating portion; and
   a limiting board, being assembled at said lower part of said base and being provided with two punch holes and positioning portions around the board, allowing the board to be mated with said coupling portion of said base via a locator; and
a charging cup holder comprising:
   a cup container, fitted with a limiting flange and a locating column;
   an adapting board, assembled onto said limiting flange and provided with two punch holes;
   a limit component, being assembled at a lower part of said adapting board and being comprised of a lug seat and an elastic part at a lower part of said lug seat, said lug seat penetrating through said two punch holes on said adapting board, said elastic part being sleeved onto said locating column of said cup container; and
   a power supply seat, being assembled at said lower part of said cup container and having male and female coupling portions between said cup container and said power supply seat, said power supply seat being fixed to said cup container via a locator.

2. The assembly defined in claim 1, wherein said cell module is comprised of a rechargeable cell structure.

3. The assembly defined in claim 1, wherein said power supply seat has an upper cover and a lower cover, said upper cover having an inner surface with an IC controller arranged thereon and having an external surface with a timer and socket thereof.

* * * * *